US012583529B2

(12) United States Patent
Choi et al.

(10) Patent No.: US 12,583,529 B2
(45) Date of Patent: Mar. 24, 2026

(54) COWL CROSS STRUCTURE

(71) Applicant: HYUNDAI MOBIS CO., LTD., Seoul (KR)

(72) Inventors: Ik Keun Choi, Yongin-si (KR); Min Kyeong Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 18/465,230

(22) Filed: Sep. 12, 2023

(65) Prior Publication Data

US 2025/0026413 A1 Jan. 23, 2025

(30) Foreign Application Priority Data

Jul. 17, 2023 (KR) ........................ 10-2023-0092256

(51) Int. Cl.

| | |
|---|---|
| ***B60R 7/06*** | (2006.01) |
| ***B60R 21/045*** | (2006.01) |
| ***B62D 25/08*** | (2006.01) |
| ***B62D 25/14*** | (2006.01) |

(52) U.S. Cl.

CPC .......... *B62D 25/145* (2013.01); *B60R 21/045* (2013.01); *B62D 25/081* (2013.01); *B60R 7/06* (2013.01)

(58) Field of Classification Search

CPC .... B62D 25/145; B62D 25/081; B62D 25/08; B60R 21/045; B60R 7/06

USPC .... 296/193.02, 70, 72, 37.12; 280/748, 751, 280/752

See application file for complete search history.

(56) References Cited

U.S. PATENT DOCUMENTS 5,482,319 A 1/1996 Yoshimura et al.

FOREIGN PATENT DOCUMENTS

| | | |
|---|---|---|
| DE | 44 27 285 A1 | 6/1995 |
| JP | 2004-203237 A | 7/2004 |
| JP | 2008-18930 A | 1/2008 |
| KR | 10-1298977 B1 | 8/2013 |
| KR | 10-2008675 B1 | 8/2019 |
| KR | 10-2022-0163819 A | 12/2022 |
| KR | 10-2023-0003853 A | 1/2023 |
| KR | 10-2023-0101294 A | 7/2023 |

OTHER PUBLICATIONS

German Office Action issued on Mar. 6, 2024, in counterpart German Patent Application No. 10 2023 125 707.2 (7 pages in English, 7 pages in German).

*Primary Examiner* — Dennis H Pedder

(74) *Attorney, Agent, or Firm* — NSIP Law

(57) ABSTRACT

A cowl cross structure including a cowl portion disposed in a driver's seat section in a width direction of a vehicle, the cowl portion including a cowl upper and a cowl lower and a crash pad portion provided in a structure extending from the cowl portion, and disposed between a center fascia section and a passenger's seat section of the vehicle, the crash pad portion including a glovebox accommodation space that is open toward an interior of the vehicle on a front surface thereof that is exposed to the interior of the vehicle.

10 Claims, 12 Drawing Sheets

710:711,712
720:721,722

COWL CROSS STRUCTURE

CROSS-REFERENCE TO RELATED APPLICATION

This application claims the benefit under 35 USC § 119 (a) of Korean Patent Application No. 10-2023-0092256, filed on Jul. 17, 2023, in the Korean Intellectual Property Office, the disclosure of which is incorporated herein by reference in its entirety for all purposes.

BACKGROUND

1. Field of the Invention

The present disclosure relates to a cowl cross structure, and more particularly, to a cowl cross structure that is capable of implementing reductions in weight.

2. Discussion of Related Art

In general, in a vehicle, a cowl cross member is installed in a width direction of the vehicle so as to prevent a vehicle body from being twisted or bent in forward and rearward directions and leftward and rightward directions by increasing strength or stiffness of the vehicle body.

The cowl cross member is installed at a boundary portion between an engine compartment of the vehicle and an interior of the vehicle body, is provided as a frame structure that is not exposed to the interior, and serves to guide and support cockpit electrical components such as a steering system, an air conditioning system, and an airbag.

FIG. 1 is a view illustrating a conventional cowl cross structure.

The conventional cowl cross structure is constituted of a circular pipe-shaped cowl cross bar extending in the width direction of the vehicle body, a cowl box mounted on the cowl cross bar to support the steering system, and a side mounting bracket fixing both ends of the cowl cross bar to the vehicle body.

Since the conventional cowl cross structure has a full-type structure in which the cowl cross bar formed of a steel material is connected to a driver's seat as well as a passenger's seat, there have been problems in that the cost is high and the weight is excessive, which reduces the fuel efficiency of the vehicle and reduces the marketability.

Therefore, there is a need to solve the problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a cowl cross structure including a cowl portion disposed in a driver's seat section in a width direction of a vehicle, the cowl portion including a cowl upper and a cowl lower and a crash pad portion provided in a structure extending from the cowl portion, and disposed between a center fascia section and a passenger's seat section of the vehicle, the crash pad portion including a glovebox accommodation space that is open toward an interior of the vehicle on a front surface thereof that is exposed to the interior of the vehicle.

The cowl cross structure may include a pipe having one end in a lengthwise direction coupled and fixed to the cowl portion, and the pipe may be coupled to the crash pad portion in a fixed state to support the crash pad portion.

The cowl lower may include an insertion hole therein, the pipe being configured to be inserted into the insertion hole, and the cowl lower also includes a touch rib formed in a protruding structure within the insertion hole and configured to be in contact with a surface of the pipe inserted into the insertion hole.

The crash pad portion may include a coupling groove defined therein into which the pipe is configured to be fitted and coupled in the lengthwise direction.

The cowl upper and the cowl lower may be configured to be mutually coupled, the cowl upper having a bolt hole defined therein through which a bolt passes and a slit hole defined therein extending from the bolt hole, and the slit hole extending in a direction different from a lengthwise direction of the cowl upper.

The crash pad portion may be provided independently of the cowl portion and is configured to be coupled to the cowl portion.

The crash pad portion may be continuously connected to the cowl lower and configured to form an integrated structure with the cowl portion.

The cowl cross structure may include a reinforcing bracket including a first end configured to be fixed to the cowl lower and a second end configured to be fixed to the crash pad portion, and the reinforcing bracket may be configured to minimize a crack that occurs between the cowl portion and the crash pad portion.

The reinforcing bracket may include a protrusion protruding forward from a front surface of the crash pad portion, a first extension and a second extension extending from a left side and a right side of the protrusion, the first extension being positioned on a front surface of the cowl lower and the second extension being positioned on the front surface of the crash pad portion, a first bent portion bent from the first extension and positioned on an inner surface of the cowl lower, and a second bent portion bent from the second extension and positioned on an upper surface of the crash pad portion, and the reinforcing bracket may be configured to elastically deform through the protrusion in a state of being fastened to the cowl lower and the crash pad portion through a fixing tool at each of the first bent portion, the second bent portion, and the second extension.

The reinforcing bracket may include a first body fitted and fixed to an upper edge of the crash pad portion, the first body including a structure protruding rearward from a rear surface of the crash pad portion and a second body fastened to an outer surface of the cowl lower and the first body through the fixing tool, and the second body may include a sliding hole defined therein being formed in a portion placed on and overlapping the first body, wherein the fixing tool is configured to slide along the sliding hole in a state of being fastened to the first body in the sliding hole.

In a general aspect, here is provided a method including forming a cowl portion, the cowl portion being configured to be affixed to a dash panel for a vehicle, the cowl portion being formed to include a cowl upper and a cowl lower, forming a crash pad portion, the crash pad portion including a structure extending in a width direction of the vehicle and a side mounting bracket to be fastened to the vehicle, and inserting a touch rib into an insertion hole defined within the cowl lower.

The method may include joining the cowl upper and the cowl lower by inserting a bolt into a bolt hole defined within the cowl upper as an elongated slit, and, when an impact is received by the bolt, when the bolt is fastened to the cowl upper, the cowl lower moves with the bolt a direction of the bolt hole to relieve deformation resulting from the impact to the dash panel.

The method may include providing a pipe having a first end coupled to the cowl lower and a second end coupled to the side mounting bracket.

The method may also include forming an insertion hole in the cowl lower, forming touch ribs extending from an inner surface of the insertion hole, and inserting the pipe into insertion hole, the touch ribs being configured to absorb a vibration of the pipe when inserted in the insertion hole.

The method may include forming a coupling groove in an upper surface of the crash pad portion in a lengthwise direction of the crash pad portion and inserting the pipe into the coupling groove.

The forming of the cowl portion may include disposing the cowl portion to not be exposed to an interior of the vehicle and the forming of the crash pad portion may include forming a glovebox accommodation space being open toward the interior of the vehicle and forming a crash pad lower including a front side portion being exposed to the interior of the vehicle.

The method may include affixing a reinforcing bracket to the cowl lower at a first backet end and to the crash pad portion at a second bracket end.

The method may also include forming the reinforcing bracket, the forming of the reinforcing bracket including forming a protrusion to protrude in a first direction, forming a first extension extending from a first side of the protrusion, the first extension being positioned on a front surface of the cowl lower, and forming a second extension extending from a second side of the protrusion, the second extension being position on a front surface of the crash pad portion, the reinforcing bracket being configured to, upon an impact, elastically deform the protrusion to absorb the impact to prevent a crack from forming between the cowl lower and the crash pad portion.

The forming of the reinforcing bracket may include forming a first bent portion bent from the first extension, the first bent portion being positioned on an inner surface of the cowl lower and forming a second bent portion bent from the second extension, the second bent portion being position on an upper surface of an upper edge of the crash pad portion.

The method may include fixing the first bent portion to the inner surface of the cowl lower through a fixing tool and fixing the second bent portion and the second extension to the crash pad portion through the fixing tool.

Figure 1:
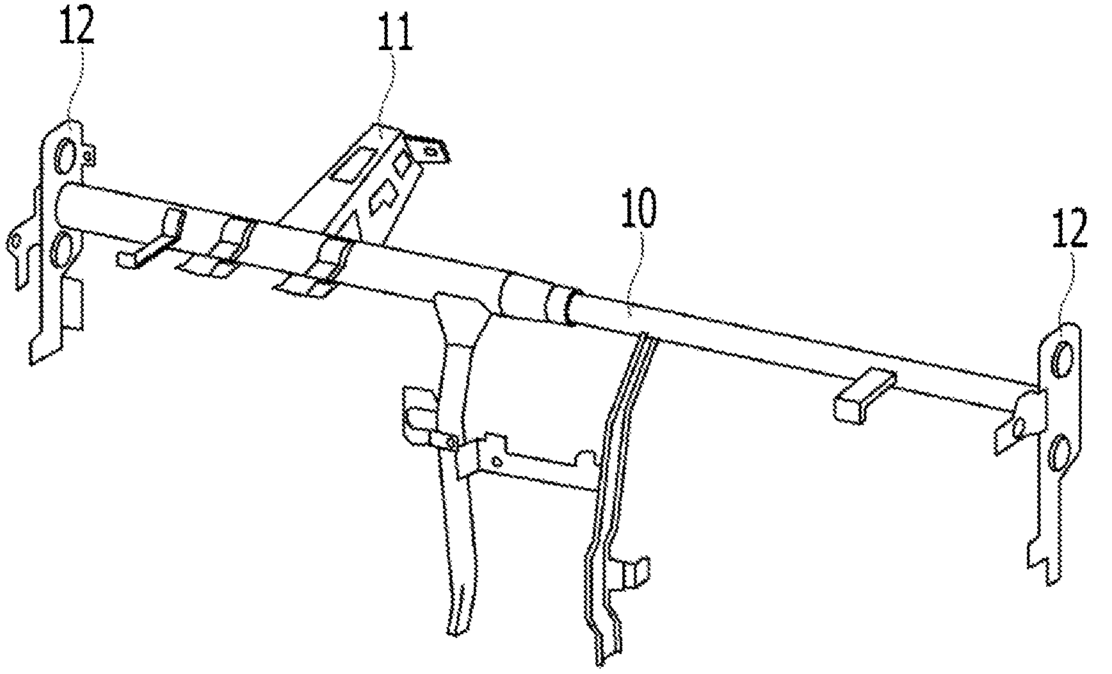
FIG. 1 is a view illustrating a conventional cowl cross structure.
Figure 2:
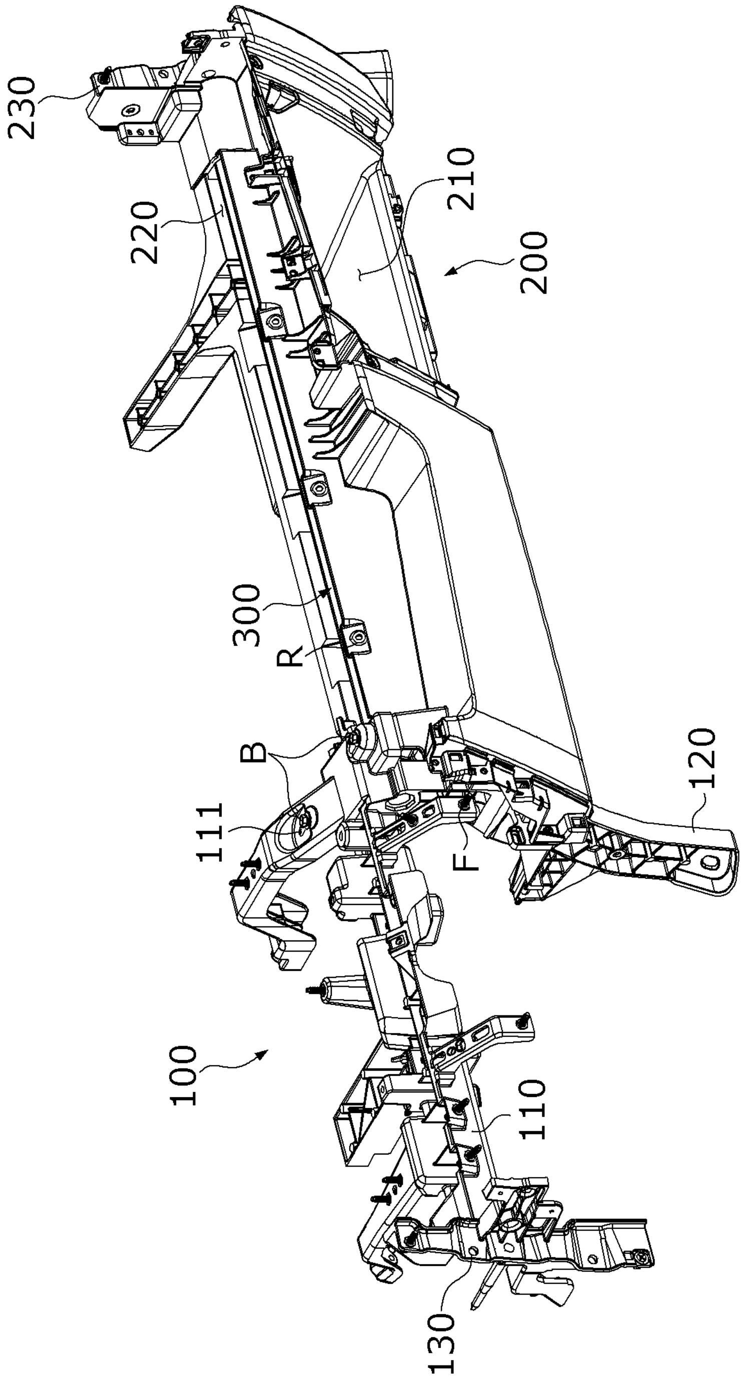
FIG. 2 is a view schematically illustrating a cowl cross structure according to an embodiment of the present disclosure.
Figure 3:
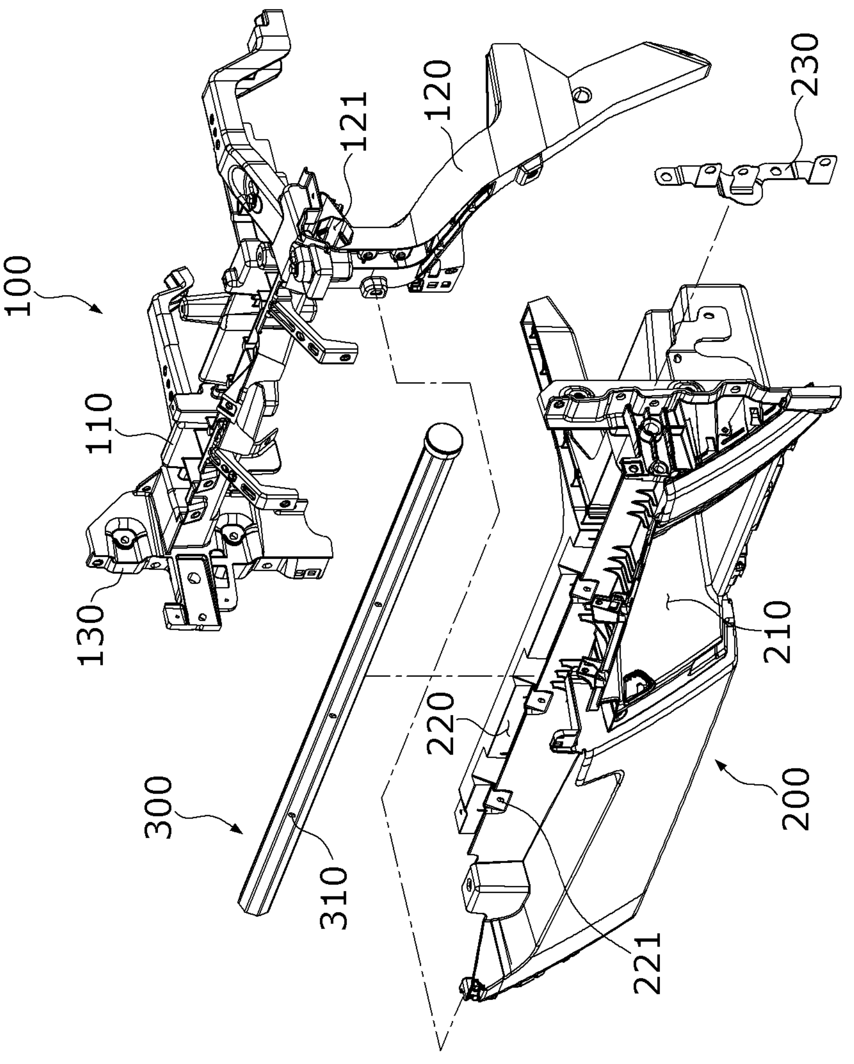
FIG. 3 is a view schematically illustrating a configuration of the cowl cross structure of FIG. 2.
Figure 4:
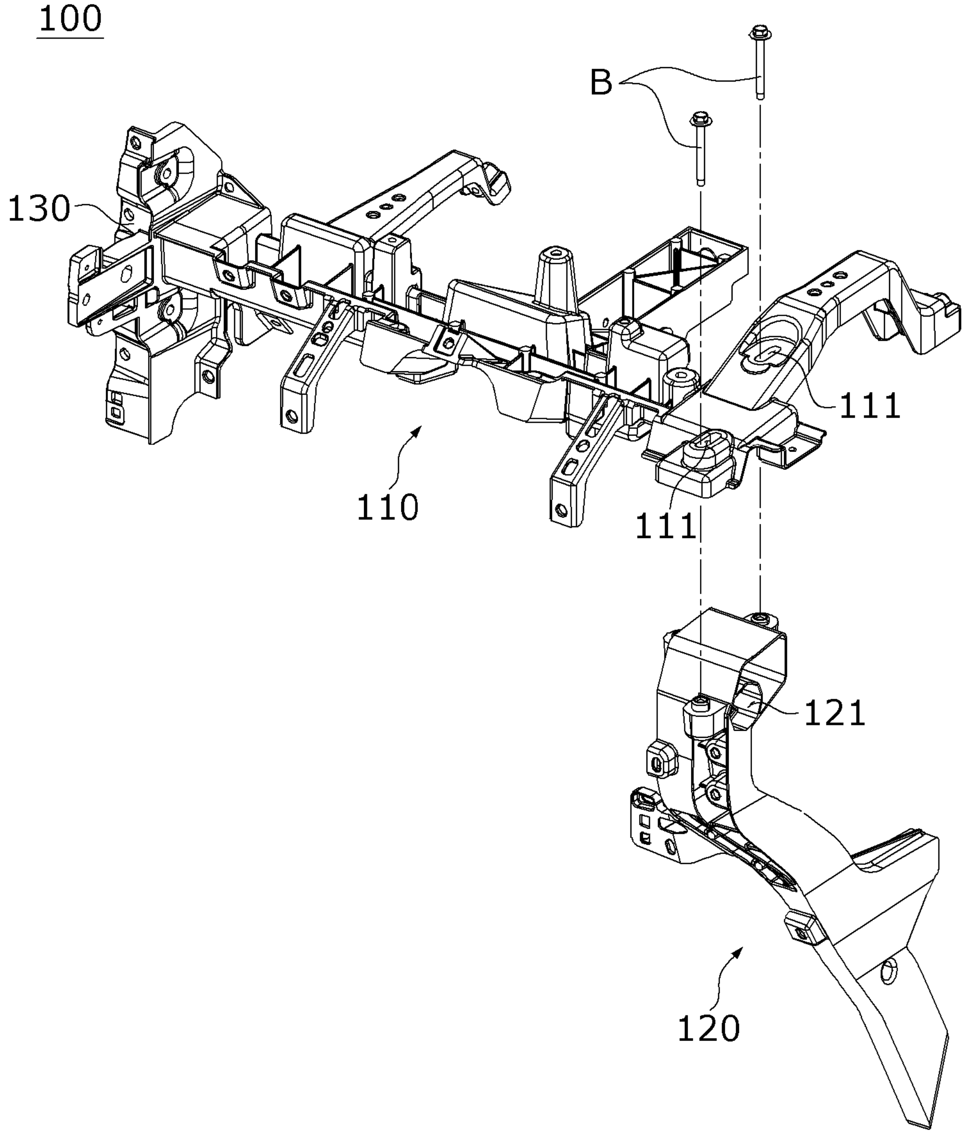
FIG. 4 is a view schematically illustrating a coupling structure of a cowl upper and a cowl lower constituting a cowl portion.
Figure 5:
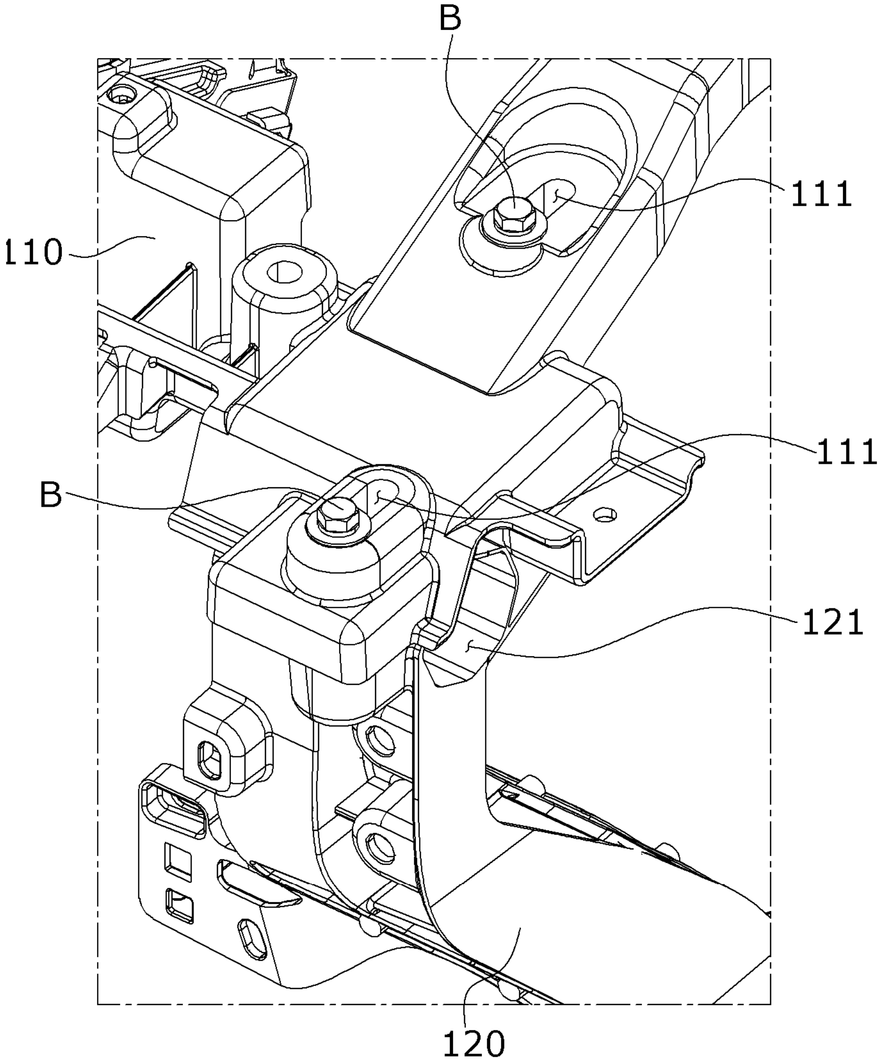
FIG. 5 is a view schematically illustrating a state in which the cowl upper and cowl lower are coupled through bolting.
Figure 6:
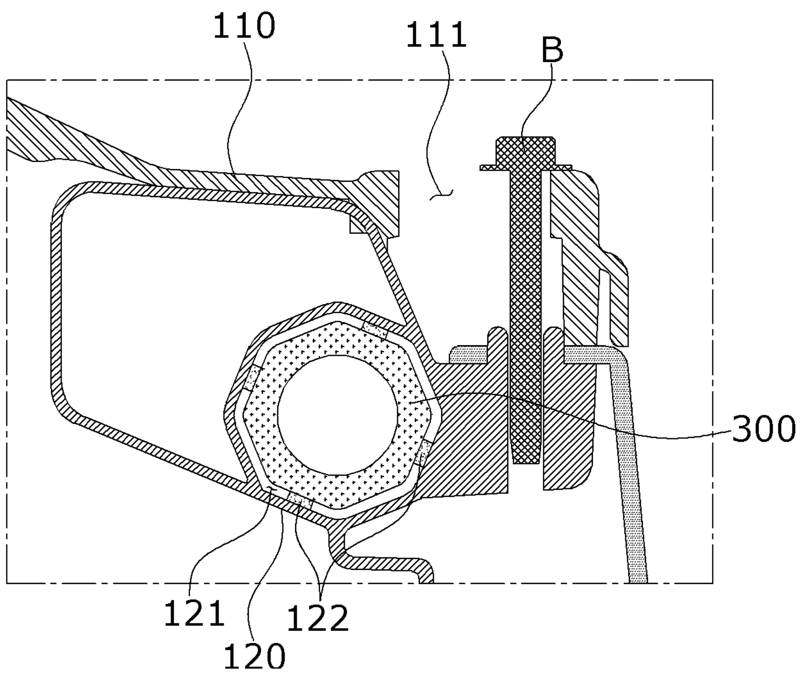
FIG. 6 is a view schematically illustrating a state in which a pipe is inserted into and coupled to an insertion hole of the cowl lower.
Figure 7:
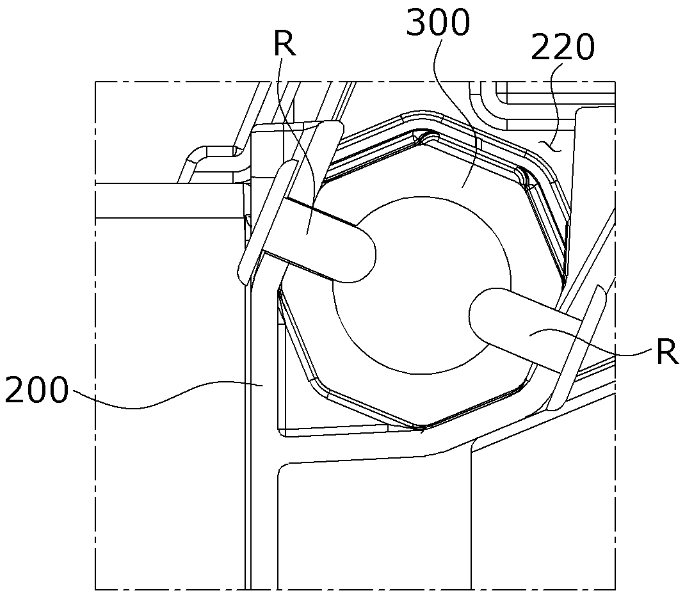
FIG. 7 is a view schematically illustrating a state in which the pipe coupled to a coupling groove of a crash pad portion is riveted.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIGS. 2 to 7 illustrate a cowl cross structure according to an embodiment of the present disclosure.

With reference to the drawings, the cowl cross structure according to the embodiment of the present disclosure may include a cowl portion 100 disposed in a driver's seat section in a width direction of a vehicle and a crash pad portion 200 disposed in a center fascia section and a passenger's seat section of the vehicle.

In this embodiment, the cowl portion 100 and the crash pad portion 200 may be provided independently of each other. Further, the crash pad portion 200 may be configured to be coupled to the cowl portion 100.

The cowl portion 100 may be made of a metallic material. For example, the cowl portion 100 may be formed by die-casting magnesium. Further, the crash pad portion 200 may be made of a plastic material. For example, the crash pad portion 200 may be formed by injection molding a plastic such as polypropylene (PP), polyamide 6 (PA6), polyamide 66 (PA66), or the like that is mixed with glass fiber (GF and LGF).

The cowl portion 100 disposed in the driver's seat section may be fastened to a dash panel (not illustrated) so that the cowl portion is not exposed to an interior of the vehicle.

The cowl portion 100 may include a cowl upper 110 and a cowl lower 120.

The cowl upper 110 may have a structure extending in the width direction of the vehicle, and may be provided with a side mounting bracket 130 that is fastened to a vehicle body on a driver's seat side at one end thereof. The side mounting bracket 130 may be formed by being die-cast integrally with the cowl upper 110.

The cowl lower 120 has a structure that extends in upward and downward directions of the vehicle, and may be coupled to the other end of the cowl upper 110. The cowl lower 120 may extend downward from the cowl upper 110 to form a center support bracket.

The cowl upper 110 and the cowl lower 120 may be coupled to each other through bolting.

The cowl upper 110 may be provided with a bolt hole 111 through which a bolt B passes. The bolt hole 111 is roughly formed as an elongated slit, and may extend in a direction different from a lengthwise direction of the cowl upper 110. In the embodiment, the bolt hole 111 may extend in forward and rearward directions of the vehicle.

A structure of the bolt hole 111 is configured to absorb some of an amount of deformation of the dash panel in the event of a vehicle collision. That is, when an impact is applied in a state in which the bolt B is fastened to the bolt hole 111, the cowl lower 120 moves with the bolt B in the extension direction of the bolt hole 111 and the impact is relieved, which allows the amount of deformation of the dash panel to be absorbed.

This impact relief and absorption of the amount of deformation of the dash panel enables deformation of the crash pad portion 200 to be reduced, as will be described below. The crash pad portion 200 is provided in a structure extending from the cowl portion 100, and may be disposed in the center fascia section and the passenger's seat section.

The crash pad portion 200, which is formed of an injection product separate from the cowl portion 100, may have one end coupled to the other end of the cowl upper 110 and the cowl lower 120 using a fixing tool F. In the embodiment, the fixing tool F may include, but is not limited to, a screw, a fixing pin, a rivet, or the like.

The crash pad portion 200 may have a structure extending in the width direction of the vehicle, and may be provided with a side mounting bracket 230 that is fastened to a vehicle body on a passenger's seat side at the other end thereof. The side mounting bracket 230, which is made of a metallic material, may be provided in the crash pad portion 200 through insert injection molding.

In addition, the crash pad portion 200 may have a glovebox accommodation space 210 that is open toward the interior of the vehicle on a front surface thereof that is exposed to the interior of the vehicle.

The crash pad portion 200 may be provided to constitute a crash pad lower whose front side is exposed to the interior of the vehicle, unlike the cowl portion 100, which is concealed by the dash panel and is not exposed to the interior of the vehicle.

In the embodiment, the cowl cross structure may further include a pipe 300 having one end in a lengthwise direction coupled and fixed to the cowl portion 100.

The pipe 300 may be coupled to the crash pad portion 200 in a fixed state and configured to support the crash pad portion 200.

The pipe 300 is formed in the form of a long tube with a hollow shape, and may be disposed in the center fascia section and the passenger's seat section of the vehicle together with the crash pad portion 200.

The pipe 300 may be made of aluminum or plastic containing fiberglass.

The pipe 300 may have one end coupled to the cowl lower 120 at the cowl portion 100, and the other end disposed to be in contact with the side mounting bracket 230.

The cowl lower 120 may have an insertion hole 121 into which an end of the pipe 300 is inserted.

A touch rib 122 may be formed in the insertion hole 121 in a protruding structure. The plurality of touch ribs 122 may be disposed spaced apart along an inner circumferential surface of the insertion hole 121 and may be configured to be in contact with a surface of the pipe 300 being inserted into the insertion hole 121. Accordingly, the pipe 300 that is inserted into the insertion hole 121 of the cowl lower 120 may be constrained so as not to shake by being in contact with the touch ribs 122, and may slidably move in an insertion direction in a state of being in contact with the touch ribs 122.

In addition, the crash pad portion 200 may have a coupling groove 220 into which the pipe 300 is fitted and coupled in the lengthwise direction.

The coupling groove 220 is provided in a structure extending from an upper surface of the crash pad portion 200 in a lengthwise direction of the crash pad portion 200, and the pipe 300 is seated within the coupling groove 220 to be coupled to the crash pad portion 200.

In the embodiment, the pipe 300 may be securely fastened by riveting through a rivet R that integrally passes through the crash pad portion 200 and the pipe 300 in a state of being seated within the coupling groove 220. To this end, each of the pipe 300 and the crash pad portion 200 may be provided with fastening holes 310 and 221 through which the rivet R passes.

As described above, the cowl cross structure according to the present embodiment has a half-type structure that is constituted of the cowl portion 100, which is made of a metallic material and disposed in the driver's seat section and the crash pad portion 200, which is made of a plastic material and disposed in the center fascia section and the passenger's seat section, and has the advantages of reducing in overall weight and reducing in cost compared to the conventional full-type structure.

In addition, there is an advantage of increasing the degree of freedom in design by injection molding only the crash pad portion 200 and fastening the crash pad portion 200 to the cowl portion 100, correspondingly even when the width and design structure of the vehicle are different for each vehicle.

Figure 8:
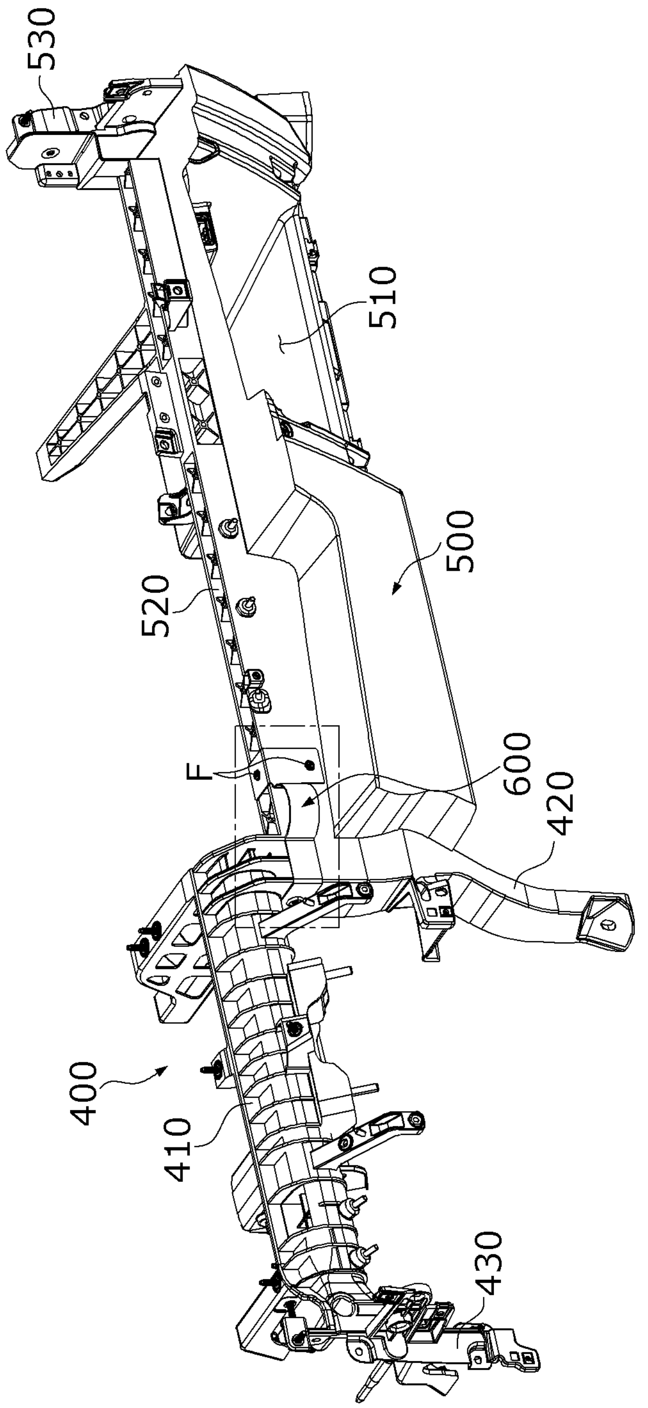
FIG. 8 is a view schematically illustrating a cowl cross structure according to another embodiment of the present disclosure.
Figure 9:
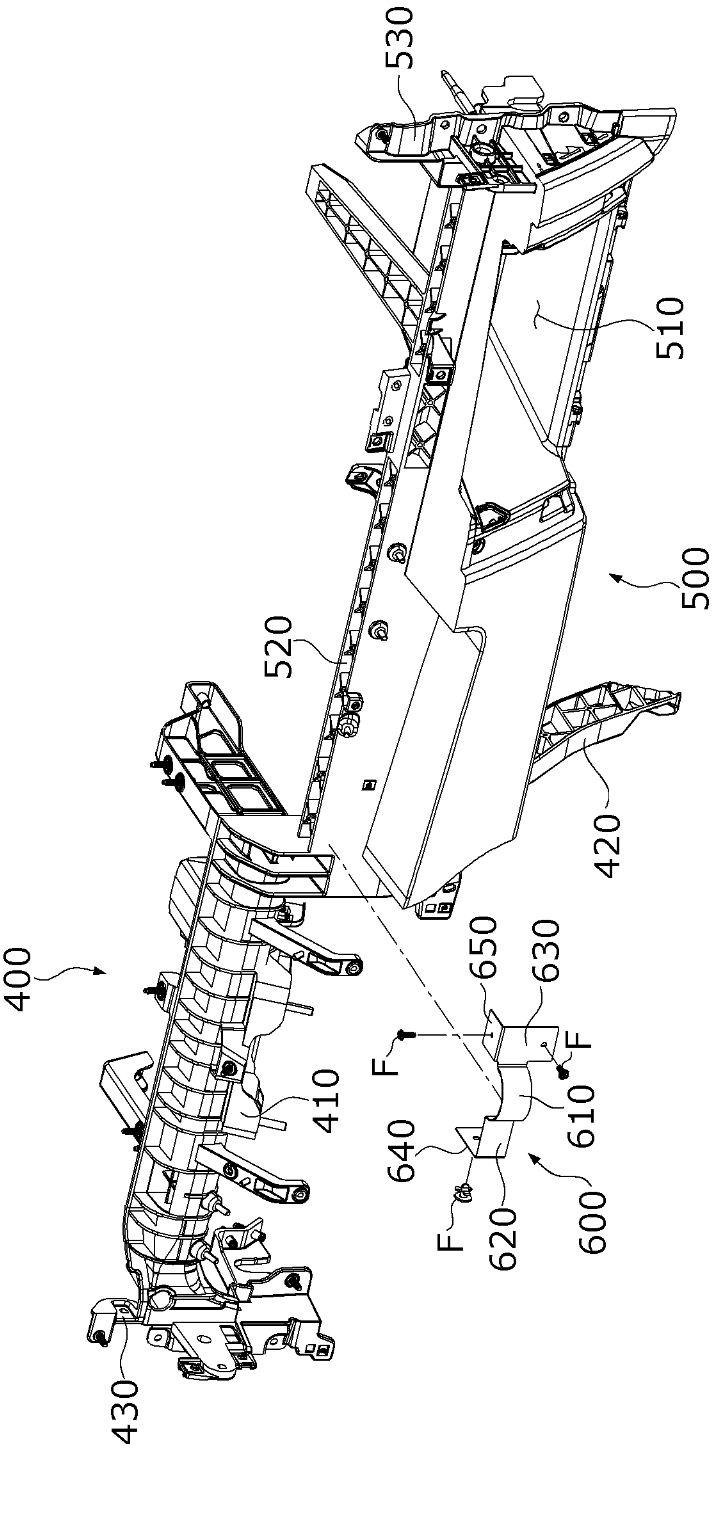
FIG. 9 is a view schematically illustrating a configuration of the cowl cross structure of FIG. 8.
Figure 10:
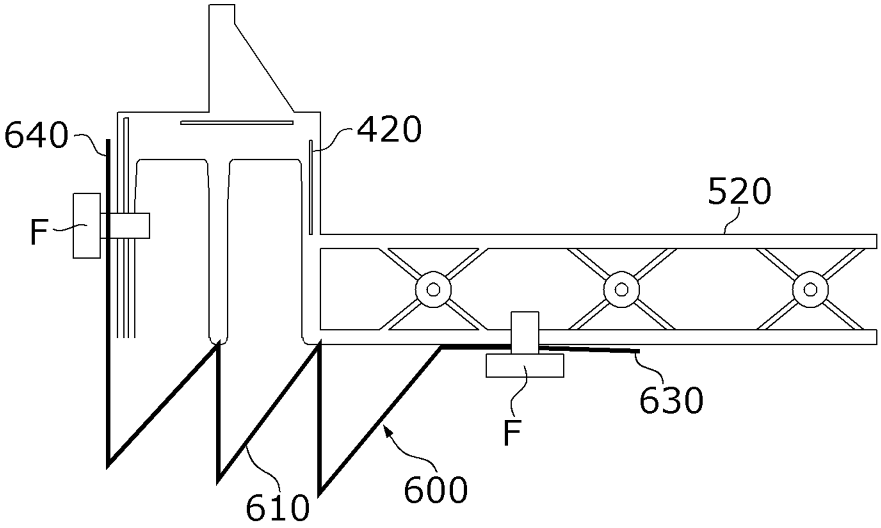
FIG. 10 is a view schematically illustrating a modified example of a reinforcing bracket.

With reference to FIGS. 8 to 10, a cowl cross structure according to another embodiment of the present disclosure is described.

FIGS. 8 and 9 schematically illustrate the cowl cross structure according to another embodiment of the present disclosure, and FIG. 10 schematically illustrates a modified example of a reinforcing bracket.

With reference to the drawings, the cowl cross structure may include a cowl portion 400 disposed in a driver's seat section in a width direction of a vehicle and a crash pad portion 500 disposed in a center fascia section and a passenger's seat section of the vehicle.

In the present embodiment, the crash pad portion 500 may be configured to form an integral structure with the cowl portion 400 by being connected continuously to a cowl lower 420. That is, unlike the embodiment according to FIG. 2, in which the cowl portion 100 and the crash pad portion 200 are provided independently of each other, the present embodiment differs in that the cowl portion 400 and the crash pad portion 500 are provided integrally.

In detail, the cowl portion 400 and the crash pad portion 500 may be integrally formed by injection molding a plastic such as polypropylene (PP), polyamide 6 (PA6), polyamide 66 (PA66), or the like. In this case, glass fiber (GF and LGF) may be mixed into the plastic.

The cowl portion 400 includes a cowl upper 410 and the cowl lower 420, and the cowl upper 410 and the cowl lower 420 may have an integrally connected structure.

The cowl upper 410 may be provided with a side mounting bracket 430 that is fastened to the vehicle body on the driver's seat side at one end thereof. Further, the cowl lower 420 may extend downward from an end of the cowl upper 410 to constitute a center support bracket.

The crash pad portion 500 may have one end extending in the width direction of the vehicle from the cowl lower 420, and may be provided with a side mounting bracket 530 that is fastened to the vehicle body on the passenger's seat side at the other end thereof.

In addition, the crash pad portion 500 may have a glovebox accommodation space 510 that is open toward the interior of the vehicle on a front side thereof that is exposed to the interior of the vehicle.

The side mounting brackets 430 and 530, which are made of a metallic material, may be provided in the cowl portion 400 and the crash pad portion 500, respectively, through insert molding.

In the cowl cross structure according to the present embodiment, depending on the materials and connection structures of the cowl portion 400 and the crash pad portion 500, a crack may occur in an area where the cowl portion 400 and the crash pad portion 500 are connected due to an impact applied in the event of a collision accident.

A reinforcing bracket 600 may be provided with a structure in which one end of the reinforcing bracket 600 is fixed to the cowl lower 420 and the other end thereof is fixed to the crash pad portion 500, and may be configured to minimize a crack that occurs between the cowl portion 400 and the crash pad portion 500.

As illustrated in the drawings, the reinforcing bracket 600 may include a protrusion 610 protruding forward from a front surface of the crash pad portion 500, a first extension 620 and a second extension 630 extending from both left and right sides of the protrusion 610, wherein the first extension 620 is positioned on a front surface of the cowl lower 420 and the second extension 630 is positioned on the front surface of the crash pad portion 500, a first bent portion 640 bent from the first extension 620 and positioned on an inner surface of the cowl lower 420, and a second bent portion 650 bent from the second extension 630 and positioned on an upper surface of an upper edge 520 of the crash pad portion 500.

In the embodiment, the reinforcing bracket 600 may be formed by cutting and bending a plate of a metallic material.

In the reinforcing bracket 600, the first bent portion 640 is fastened and fixed to the inner surface of the cowl lower 420 through the fixing tool F, and the second bent portion 650 and the second extension 630 are fastened and fixed to the crash pad portion 500 through the fixing tool F.

Further, the reinforcing bracket 600 may be configured to elastically deform through the protrusion 610 in a state of being fastened to the cowl lower 420 and the crash pad portion 500 through the fixing tool F at each of the first bent portion 640, the second bent portion 650, and the second extension 630.

In detail, the protrusion 610 of the reinforcing bracket 600 may be positioned at a portion in which the cowl lower 420 and the crash pad portion 500 are connected. Further, when an impact is applied by a vehicle collision in a state in which both left and right sides are fixed to the cowl lower 420 and the crash pad portion 500, respectively with respect to the protrusion 610, the protrusion 610 is elastically deformed and absorbs the impact. That is, the protrusion 610 will absorb the impact by being bent and tensile. Therefore, it is possible to prevent or minimize cracking between the cowl lower 420 and the crash pad portion 500.

In the present embodiment, the protrusion 610 is exemplified as protruding in an arc shape, but is not limited thereto.

With reference to FIG. 10, the protrusion 610 may also have a structure folded in the shape of a spring, and thus the protrusion 610 may be configured to be tensile in the lengthwise direction to absorb the impact. In addition, the protrusion 610 may have a variety of elastically deformable shapes.

Figure 11:
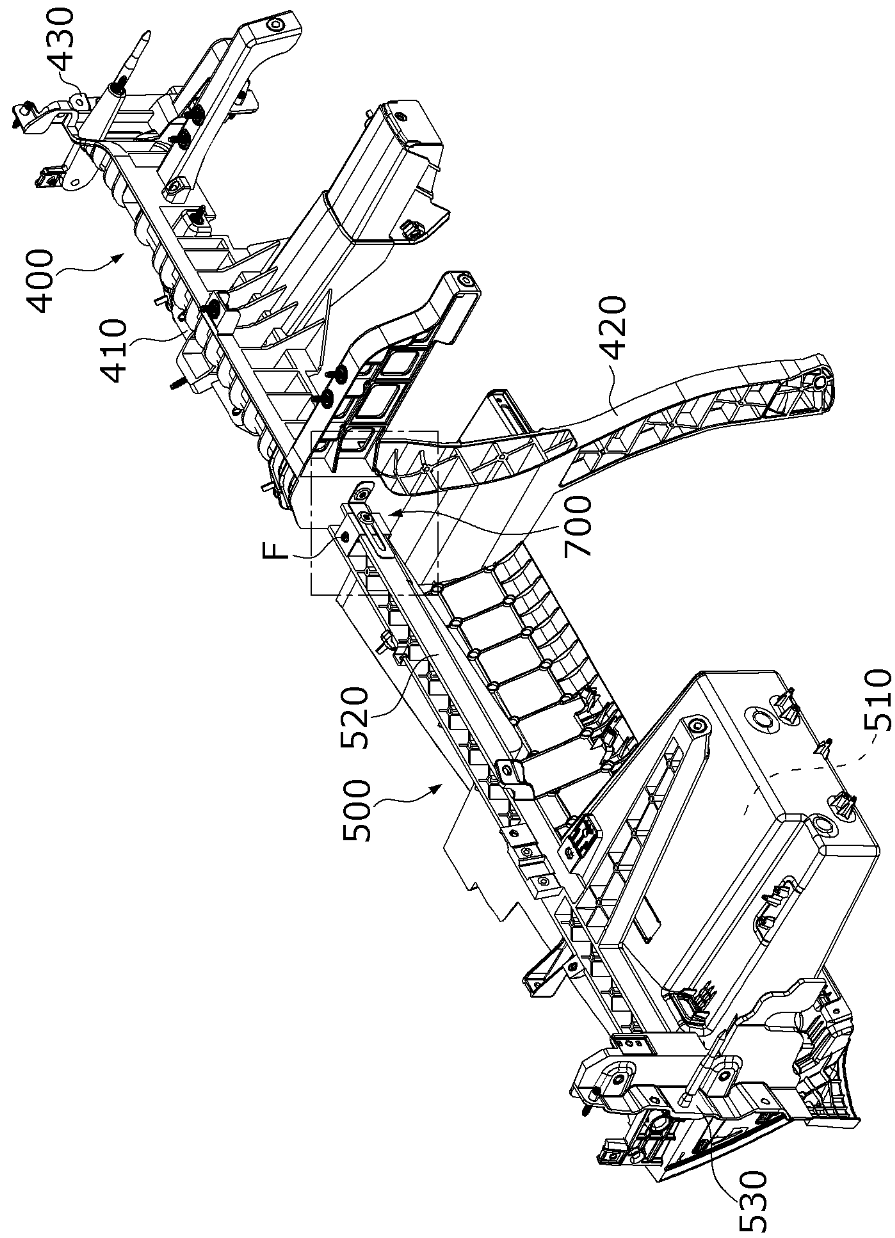
FIG. 11 is a view schematically illustrating a state in which a reinforcing bracket according to another embodiment is mounted on a cowl portion and a crash pad portion.
Figure 12:
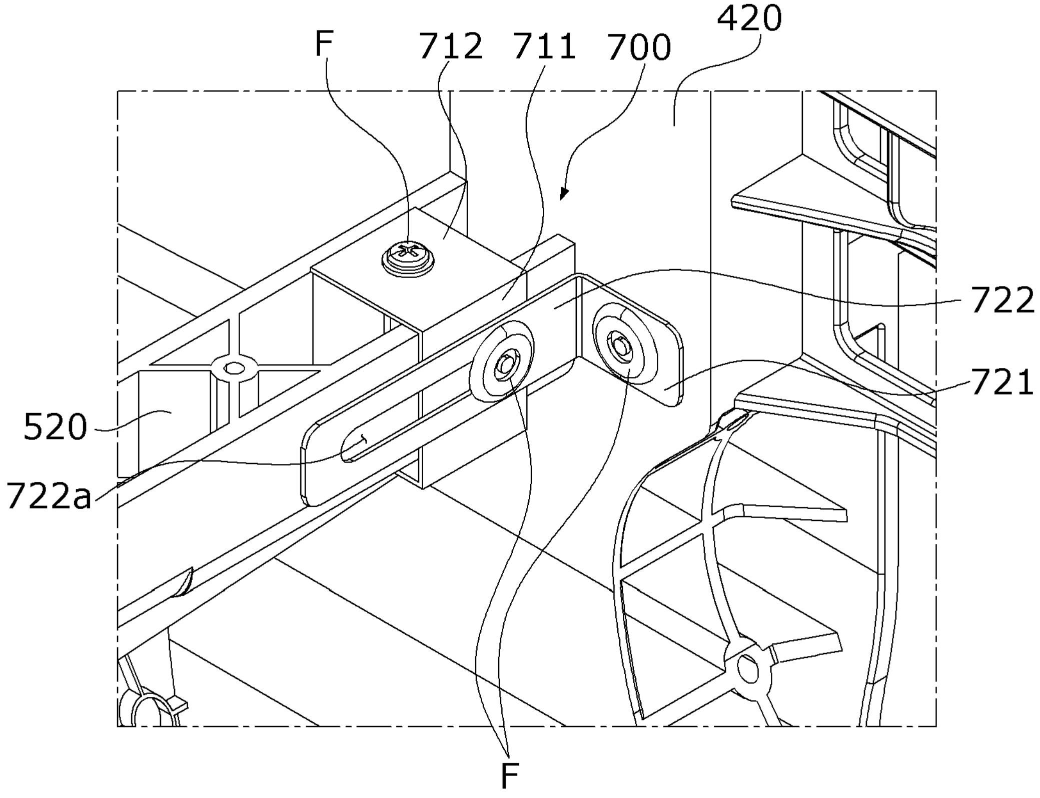
FIG. 12 is an enlarged view of the reinforcing bracket of FIG. 11.
Figure 13:
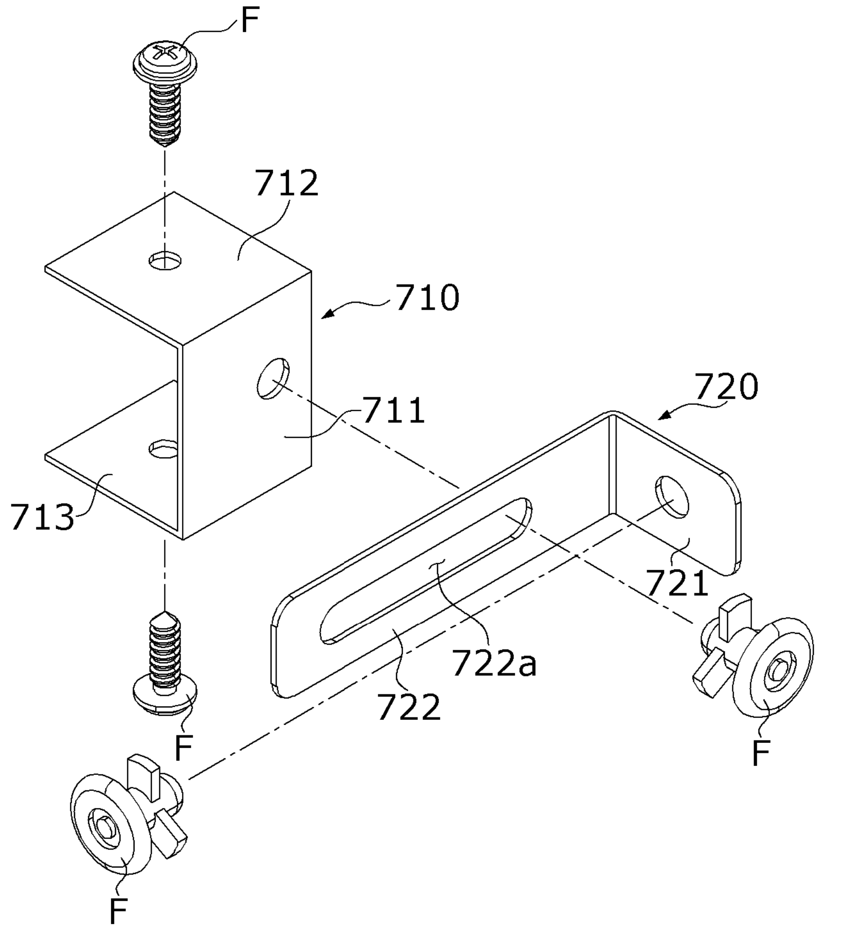
FIG. 13 is a view schematically illustrating a configuration of the reinforcing bracket of FIG. 11.

FIGS. 11 to 13 illustrate another embodiment of a reinforcing bracket.

As illustrated in the drawings, a reinforcing bracket 700 may include a first body 710 that is fitted and fixed to the upper edge 520 of the crash pad portion 500 having a structure protruding rearward from a rear surface of the crash pad portion 500, and a second body 720 that is fastened to each of an outer surface of the cowl lower 420 and the first body 710 through the fixing tool F.

The first body 710 may be constituted of a base portion 711 disposed at a rear surface of the upper edge, and a pair of wing portions 712 and 713 extending from upper and lower ends of the base portion 711, respectively, and disposed on the upper and lower surfaces of the upper edge 520, and may have a "C"-shaped structure as a whole.

The first body 710 may be fixed through the fixing tool F that passes through the pair of wing portions 712 and 713 and is fastened to each of the upper and lower surfaces of the upper edge 520.

The second body 720 is constituted of a fixed portion 721 that is in contact with the outer surface of the cowl lower 420, and a guide portion 722 that is bent from the fixed portion 721 and disposed parallel to a rear surface of the upper edge 520, and may have a structure in the shape of "¬" as a whole. The guide portion 722 is disposed in a structure placed on and overlapping the base portion 711, and a sliding hole 722*a* may be formed in the guide portion 722 in a lengthwise direction.

The first body 710 and the second body 720 may be made of a metallic material.

The fixed portion 721 may be fastened and fixed to the outer surface of the cowl lower 420 through the fixing tool F, and the guide portion 722 may be fastened and fixed to the base portion 711 of the first body 710 through the fixing tool F. That is, the second body 720 may be coupled to the cowl lower 420 and the first body 710. In this case, the fixing tool F is fastened to the first body 710 through the sliding hole 722*a*.

The reinforcing bracket 700 according to the present embodiment may be configured to slide along the sliding hole 722*a* in a state in which the fixing tool F that fastens the first body 710 and the second body 720 are fastened to the first body 710 at the sliding hole 722*a*.

In detail, the first body 710 of the reinforcing bracket 700 is fixed to the upper edge 520 of the crash pad portion 500, the second body 720 is fixed to the cowl lower 420, and the first body 710 and the second body 720 may be mutually connected by being fastened through the fixing tool F. Further, when an impact is applied by a vehicle collision, the fixing tool F connecting the first body 710 and the second body 720 moves along the sliding hole 722*a* to absorb the impact. That is, the cowl lower 420 and the crash pad portion 500 may be deformed and absorb the impact to prevent or minimize cracking between the cowl lower 420 and the crash pad portion 500.

As described above, the cowl cross structure according to the present embodiment has an effect of reducing overall weight and reducing cost by injection molding the cowl portion 400 and the crash pad portion 500 as an integrated piece with a plastic material.

In addition, as the reinforcing brackets 600 and 700 are provided between the cowl portion 400 and the crash pad portion 500, and an external impact is absorbed through the reinforcing brackets 600 and 700 being elastically deformed, it is possible to minimize cracking in an area where the cowl portion 400 and the crash pad portion 500 are connected, and to increase rigidity.

According to an embodiment of the present disclosure, it is possible to provide a cowl cross structure that is capable of reducing the weight of a cowl cross while preventing a passenger from being injured in the event of a collision accident.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cowl cross structure, comprising:

a cowl portion disposed in a driver's seat section in a width direction of a vehicle, the cowl portion comprising a cowl upper and a cowl lower; and a crash pad portion provided in a structure extending from the cowl portion, and disposed between a center fascia section and a passenger's seat section of the vehicle, wherein the crash pad portion includes a glovebox accommodation space defined therein, the glove box accommodation space being open toward an interior of the vehicle on a front surface thereof that is exposed to the interior of the vehicle.

2. The cowl cross structure of claim 1, further comprising a pipe having one end in a lengthwise direction coupled and fixed to the cowl portion, wherein the pipe is coupled to the crash pad portion in a fixed state to support the crash pad portion.

3. The cowl cross structure of claim 2, wherein the cowl lower includes an insertion hole therein, the pipe being configured to be inserted into the insertion hole, and wherein the cowl lower further comprises a touch rib formed in a protruding structure within the insertion hole and configured to be in contact with a surface of the pipe inserted into the insertion hole.

4. The cowl cross structure of claim 2, wherein the crash pad portion has a coupling groove defined therein into which the pipe is configured to be fitted and coupled in the lengthwise direction.

5. The cowl cross structure of claim 1, wherein the cowl upper and the cowl lower are configured to be mutually coupled, wherein the cowl upper includes a bolt hole defined therein through which a bolt passes and a slit hole defined therein extending from the bolt hole, and wherein the slit hole extends in a direction different from a lengthwise direction of the cowl upper.

6. The cowl cross structure of claim 1, wherein the crash pad portion is provided independently of the cowl portion and is configured to be coupled to the cowl portion.

7. The cowl cross structure of claim 1, wherein the crash pad portion is continuously connected to the cowl lower and configured to form an integrated structure with the cowl portion.

8. The cowl cross structure of claim 1, further comprising a reinforcing bracket comprising a first end configured to be fixed to the cowl lower and a second end configured to be fixed to the crash pad portion, wherein the reinforcing bracket is configured to minimize a crack that occurs between the cowl portion and the crash pad portion.

9. The cowl cross structure of claim 8, wherein the reinforcing bracket comprises:

a protrusion protruding forward from a front surface of the crash pad portion;

a first extension and a second extension extending from a left side and a right side of the protrusion, the first extension being positioned on a front surface of the cowl lower and the second extension being positioned on the front surface of the crash pad portion;

a first bent portion bent from the first extension and positioned on an inner surface of the cowl lower; and a second bent portion bent from the second extension and positioned on an upper surface of the crash pad portion, and wherein the reinforcing bracket is configured to elastically deform through the protrusion in a state of being fastened to the cowl lower and the crash pad portion through a fixing tool at each of the first bent portion, the second bent portion, and the second extension.

10. The cowl cross structure of claim 9, wherein the reinforcing bracket comprises:

a first body fitted and fixed to an upper edge of the crash pad portion, the first body comprising a structure protruding rearward from a rear surface of the crash pad portion; and a second body fastened to an outer surface of the cowl lower and the first body through the fixing tool, and wherein the second body includes a sliding hole defined therein being formed in a portion placed on and overlapping the first body, wherein the fixing tool is configured to slide along the sliding hole in a state of being fastened to the first body in the sliding hole.

* * * * *